United States Patent

[11] 3,585,327

[72] Inventor George K. Farmery
 Scothern, near Lincoln, England
[21] Appl. No. 757,687
[22] Filed Sept. 5, 1968
[45] Patented June 15, 1971
[73] Assignee Clayton Dewandre Company Limited
 Lincoln, England
[32] Priority Sept. 14, 1967
[33] Great Britain
[31] 41922/67

[54] VEHICLE BRAKING APPARATUS WITH FLUID PRESSURE OPERATING AND LOCK MECHANISM FOR MICROSWITCH
 6 Claims, 2 Drawing Figs.

[52] U.S. Cl. .................................................. 200/83,
 340/69, 303/89
[51] Int. Cl. ............................................... B60q 1/44,
 H01h 35/40
[50] Field of Search........................................... 200/82,
 83.(2), 83.(5), 83.3, 83.32, 83.4; 92/92, 93, 99;
 188/1 A, 72.1; 340/52, 52 C, 69; 303/84, 89

[56] References Cited
 UNITED STATES PATENTS

| | | | |
|---|---|---|---|
| 2,584,938 | 2/1952 | Sweeny et al. | 340/69 |
| 2,724,101 | 11/1955 | Hallman | 340/69 X |
| 2,788,514 | 4/1957 | Schmitt | 340/69 X |
| 2,891,234 | 6/1959 | Hague | 340/69 |
| 2,314,266 | 3/1943 | Beam | 200/83 (.2) X |
| 3,026,387 | 3/1962 | Ashbaugh | 200/82 (.2) |
| 3,096,505 | 7/1963 | Richins | 200/82 (.31) X |
| 3,205,785 | 9/1965 | Hoffer | 92/99 X |
| 3,260,816 | 7/1966 | Schad | 200/83 (.5) |
| 3,449,535 | 6/1969 | Otto et al. | 200/82 (.2) |

*Primary Examiner*—J. R. Scott
*Attorney*—Norris & Bateman

ABSTRACT: Fluid pressure operated braking apparatus for motor vehicles comprises a lock actuator associated with a brake chamber thereof and switch mechanism operable upon movement of the actuator to the locking condition to close the circuit to visible or audible signal ro alarm devices.

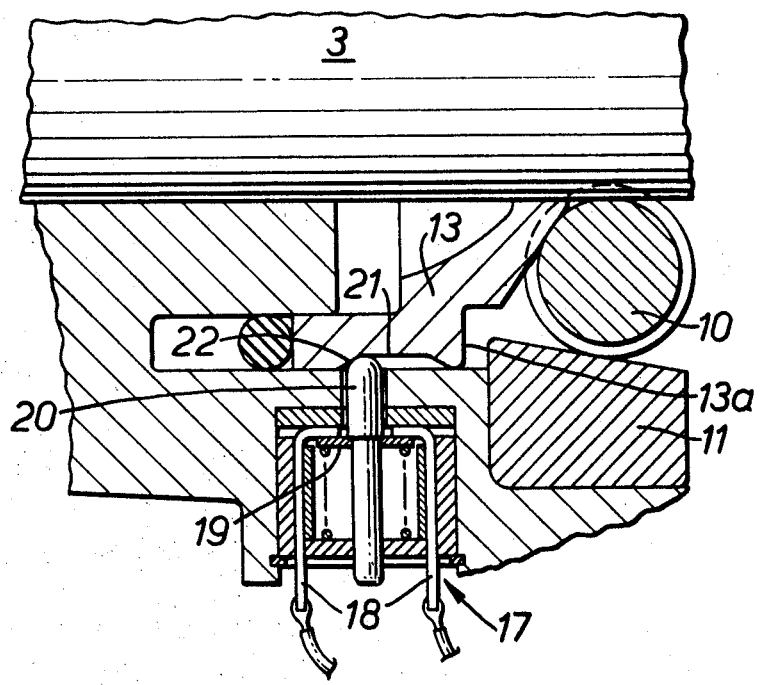

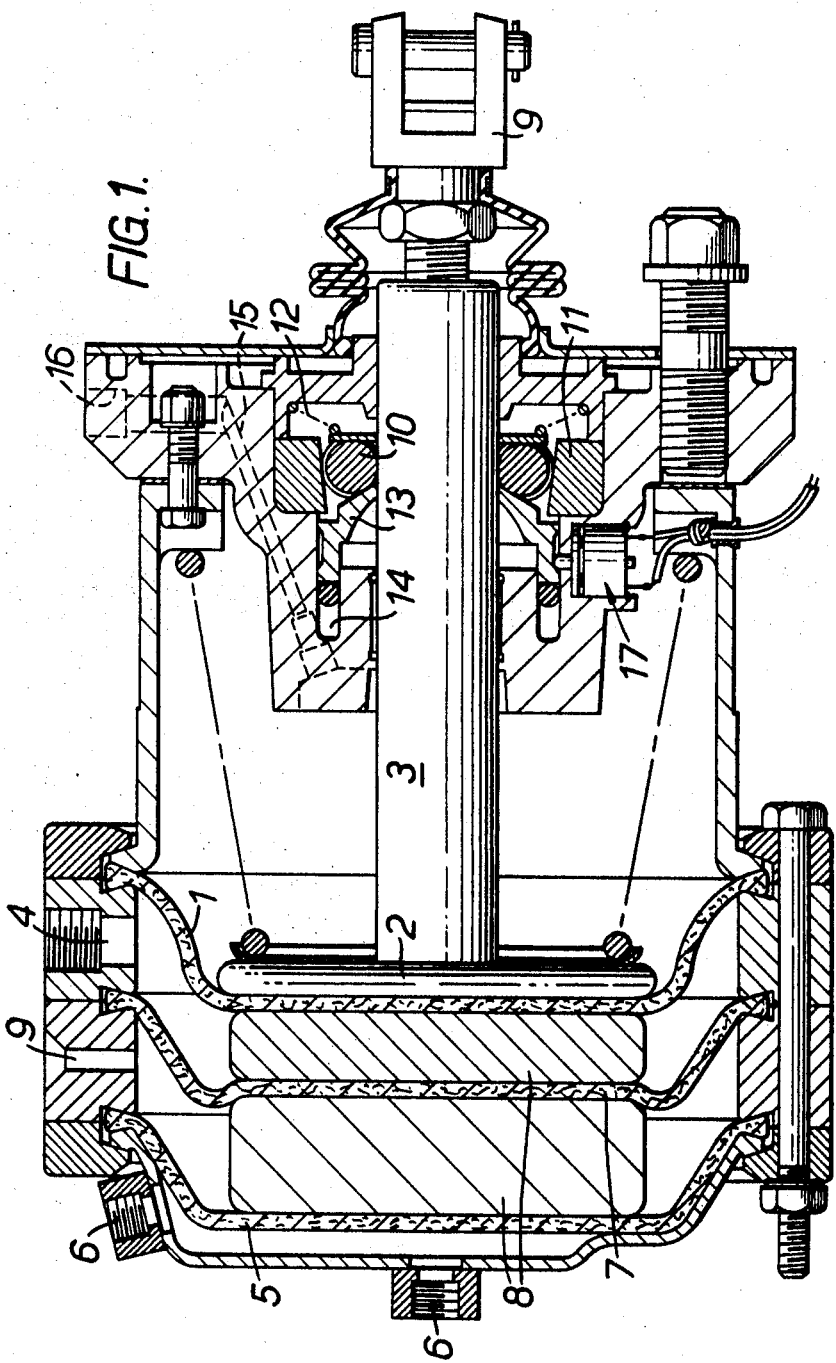

VEHICLE BRAKING APPARATUS WITH FLUID PRESSURE OPERATING AND LOCK MECHANISM FOR MICROSWITCH

This invention relates to fluid pressure operated braking apparatus for motor vehicles.

The present regulations relative to the parking of goods vehicles including tractor/trailer combinations are such that parking brakes on one axle only are often insufficient under fully loaded conditions whilst extension of the orthodox handbrake system to more than one axle creates extreme difficulties, particularly if a steering axle is involved.

One method proposed for meeting these more arduous operating conditions is the provision of so-called "lock actuators" which are usually associated with the brake chambers, servomotors or equivalent fluid pressure operated brake actuators and allow these chambers of motors to be used for parking, said lock actuators embodying roller and wedge or equivalent locking mechanism coacting with the output rod of a brake chamber or equivalent part of the brake linkage and spring-urged to a locking condition but normally held in an inoperative condition by the reservoir pressure of the fluid pressure operating system. There is additionally, a manual control which, when moved into a "Park" position, applies the brakes and also vents pressure from the lock actuators so that the brakes are locked on. Equally, a failure in the supply of pressure to the lock mechanism will result in any subsequent brake application being locked on at the brakes.

However, a disadvantage of the present lock actuator systems is that should a driver move or attempt to move the vehicle without having noted a failure of the pressure supply, or with the hand controls left inadvertently in the "Park" position, either of which will result in the brakes remaining locked on, considerable damage could be caused to the vehicle transmission, and it is the object of the present invention to provide means for safeguarding the vehicle against this risk.

According to the invention there is associated with a lock actuator a switch mechanism which is operable upon movement of the actuator to the locking condition to render operative visible and/or audible signal or alarm means.

Reference will now be made to the accompanying drawings wherein:

FIG. 1 is an axial section through a brake chamber incorporating lock actuator mechanism and associated signalling means according to the invention; and FIG. 2 is a fragmentary sectional view to an enlarged scale showing details of the switch mechanism.

In the drawings, the brake chamber is of the triple-diaphragm compressed air-actuated type and comprises a service diaphragm 1 in abutment with a thrust plate 2 on one end of a spring-loaded push rod 3, a port 4 to the space behind diaphragm 1 adapted to be connected to the service line and/or circuit, an emergency diaphragm 5, ports 6 leading to the space behind diaphragm 5 and connected in use to an emergency or "Parking" circuit, an intermediate diaphragm 7 and spacer pads 8 between the diaphragms, the space between diaphragms 5 and 7 being permanently connected to atmosphere through vent passage 9 whereby in the event of loss of pressure in one circuit through failure of diaphragm 1 or 5, the other diaphragm and associated circuit will remain operative.

The push rod 3 is connected at its other end by fork 9 to the brake mechanism to be actuated and, intermediate its ends, the rod is engaged by a conventional lock actuator mechanism. This mechanism comprises a ring of rollers 10 interposed between the rod 3 and a fixed concentric ring 11 which is coned or tapered on its inner face, a spring 12 urging the roller assembly in the direction to wedge the rollers between the rod and said ring, and a piston sleever 13 engaging the roller assembly and having an annular portion movable in a chamber 14 connected by a passage 15 to a lock port 16, the latter being connected in use to the air supply reservoir.

Thus while supply pressure is maintained, the locking rollers are held in an inoperative position by the piston sleeve 13 but if the pressure at the lock port falls below a predetermined value, either by a failure in the system or by deliberate venting, the push rod 3 will move through the rollers at the next brake actuation but the spring 12 will then urge the roller assembly into the wedging or locking position to hold the push rod against return movement whereby the brakes are locked on.

For the purpose of the invention a switch 17 is built into the end of the brake unit for operation by the lock actuator mechanism such that in any position of the lock other than the fully released position the switch is actuated to close the circuit of a red light or equivalent warning device (not shown) conveniently placed in the driver's cab. The switch is shown in detail in FIG. 2 and comprises a pair of spaced contacts 18, a contact strip 19 spring-loaded in a direction to engage and bridge the inturned ends of contacts 18, and an operating plunger 20, said plunger having an enlarged head which at its outer end abuts the bridging contact 19 and at its inner end engages a recessed portion or neck 21 on the piston sleeve 13. The neck 21 is connected to the full diameter portion by an inclined wall or ramp 22 so that the plunger head will ride smoothly from one sleeve portion to the other upon displacement of the piston.

In FIG. 2 the rollers are shown in the locking position and the switch is in the closed or "On" position to render the warning device operative and it will be seen that further movement of the piston sleeve to the right will cause the plunger head to ride up the ramp 22 onto the larger sleeve diameter thereby depressing the plunger and opening the switch to break the electrical circuit to the warning device. This further movement of the piston sleeve is limited by abutment of a shoulder 13a on the sleeve with the lock ring 11 and in practice the switch actuating means are so designed that the warning device is switched off only when the lock rollers are fully disengaged from the push rod and lock ring.

With the above described arrangement it will be understood that with the mechanical lock applied, the red light or similar warning device is operative, whether or not the brakes are applied. When the driver's control is moved from the "Park" position, fluid pressure releases the mechanical lock and simultaneously the piston sleeve permits the switch to open whereby the warning device ceases to function and it is then safe for the driver to proceed.

I claim:

1. Fluid pressure operated braking apparatus comprising an actuator having a fluid pressure responsive device and a vehicle brake operating member adapted to be moved thereby in the brake applying direction, said member being adapted to move in the return direction upon release by said device, locking mechanism adapted to be operable after movement of said member in the brake applying direction for holding said member against return movement whereby to retain said member in brake applying position, movable lock actuator means operably connected to said locking mechanism, fluid pressure responsive means operably connected to said locking mechanism, means providing a source of fluid pressure in the vehicle connected to control said fluid pressure responsive means so that said lock actuator means is normally positioned to maintain said locking mechanism inoperative to hold said member against return movement but is positioned to permit said locking mechanism to be operative to hold said member against return movement when said source pressure is below a predetermined amount, and signal means actuated in response to movement of said lock actuator means for indicating whether said locking mechanism is conditioned to prevent or permit said return movement of said member.

2. Braking apparatus as defined in claim 1, wherein said signal means comprises switch means connected to actuate an alarm only when said locking mechanism is conditioned to lock said brakes in applied position.

3. Braking apparatus as defined in claim 1, wherein said signal means comprises electric switch means operated by movement of said lock actuator.

4. Braking apparatus as defined in claim 3, wherein aid lock actuator is a piston disposed in a chamber connected to said source of fluid pressure, and said switch means is operably connected to said piston.

5. Braking apparatus as defined in claim 4, wherein said piston has control cam portions and said switch means has an operating plunger engageable with said cam portions in different displaced positions of said piston.

6. Vehicle braking apparatus of the type comprising a brake operating rod, means for moving said rod for service actuation of the vehicle brakes, independently operated means for moving said rod for auxiliary actuation of the vehicle brakes, means responsive to an actuation of said means for auxiliary actuation of the vehicle brakes for locking the vehicle brakes in applied condition comprising a wedge and roller mechanism surrounding said rod, a movably mounted control piston operably connected to said mechanism, means for connecting said control piston to a source of fluid under pressure in the vehicle for maintaining said locking means normally inoperative, means for operating said locking means to lock the vehicle brakes in applied condition when said fluid pressure falls below a predetermined value, and signal means connected to be responsive to the condition of operation of said locking means for indicating whether said locking means is operative or inoperative comprising switch means responsive to displacement of said piston and connected to a sensitive alarm.